No. 33,283.  
C. SELLERS.  
MODE OF TRANSMITTING MOTION.  
PATENTED SEPT. 10, 1861.
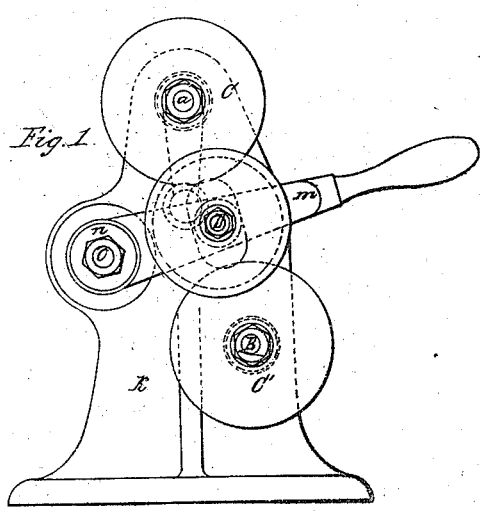
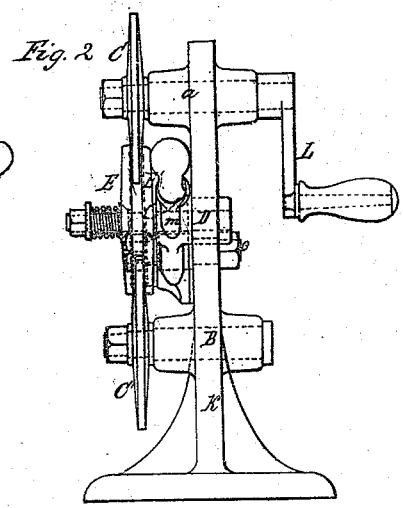
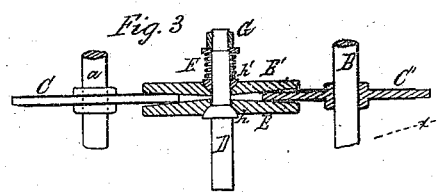
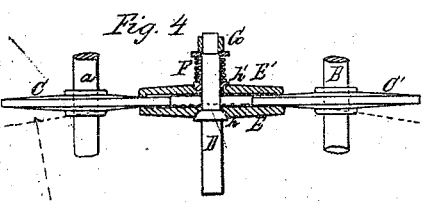
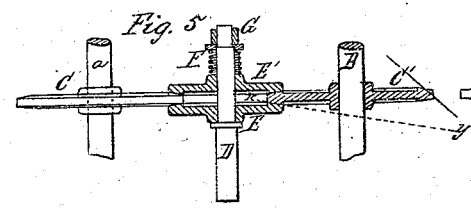
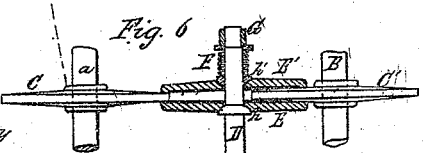
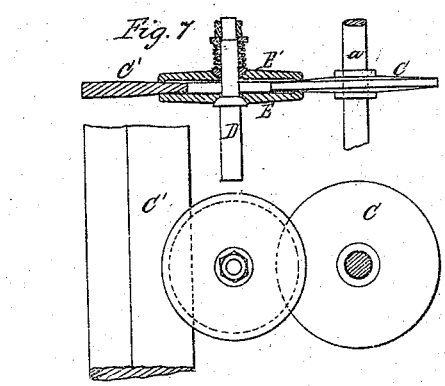
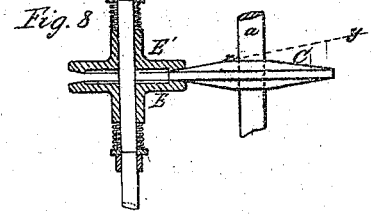
Witnesses:  
Theodore Bergner  
Oliver Hough  
Inventor:  
Coleman Sellers

UNITED STATES PATENT OFFICE.

COLEMAN SELLERS, OF PHILADELPHIA, PENNSYLVANIA, ASSIGNOR TO WM. SELLERS & CO., OF SAME PLACE.

IMPROVEMENT IN MODE OF TRANSMITTING MOTION.

Specification forming part of Letters Patent No. 33,283, dated September 10, 1861.

*To all whom it may concern:*

Be it known that I, COLEMAN SELLERS, of Philadelphia, in the State of Pennsylvania, have invented a new and useful Mode of Transmitting Motion; and I do hereby declare that the following is a full and exact description thereof.

The object of my invention is to effect the transmission of motion by frictional contact, so as, first, to insure the adhesion of the surfaces in contact and to compensate for inequalities of surface arising either from wear or inaccuracy of workmanship without affecting the position of the centers of rotation; secondly, to furnish a ready means of changing the relative velocity of the driver and driven; and, thirdly, to prevent the strain on the journals being increased much, if any, over what is due to the power transmitted, as in ordinary cog-gearing.

To understand fully the nature of my invention, it is necessary that we should briefly consider the forms of machinery now used for transmitting motion by frictional contact. The most common form is the ordinary belt and pulley. In this the whole power transmitted tends to draw the two shafts together, producing a strain on the journals at least equal to the power transmitted. The necessary amount of adhesion is obtained by tightening the belt, either by making it so long and running it horizontally that its own weight will give it the necessary pressure on the contact-surfaces, the drawing of the belt very tight in first uniting its ends, and depending upon the elasticity of the substance forming the belt to keep it tight, or the introduction of an intermediate or tightening pulley, which, pressed against the slack side of the belt, keeps up the pressure on the surfaces of the pulleys. This form, considering the great lateral strain on the two shafts, does not accomplish the third object of my invention—viz., little or no pressure on the journals or bearings from the force used in keeping the surfaces in contact.

The second object of my invention can be obtained in the use of the belt and pulley by making the well-known device of the two conical pulleys with the belt so arranged as to shift over their varied diameters; but in practice this has been found to be very objectionable, owing to the tendency of the belt to climb up to the highest part of the pulley and the unequal stretching of the substance composing the belt. Hence, although the belt and pulley furnish a means of transmitting motion by frictional contact, yet they do not fulfill all the requirements that I have stated as the objects to be obtained by my invention. Passing from the belt and pulley, the next form of device for transmitting motion by frictional contact I shall allude to is that which is usually called "friction-gearing." This in its simplest form is where two wheels with their shafts parallel, have their rims or edges forced together by pressure on their journals. This has been but a poor device, for the surface in contact is so small and the absorption of power from the pressure on the journals so great that but little effective power can be transmitted.

To obviate this difficulty there has been a plan adopted which seems to work well in practice—viz., grooving the faces of the two wheels with uniform grooves having their sides slightly beveled, so that when the tongues of one are forced into the grooves of the other they shall wedge in, and by that means have a great amount of adhesion with little pressure on their journals. This fills the requirement of the third object of my invention, but is not applicable to either of the other objects; for to force these tongues and grooves into one another of necessity involves a change of position in the axis of one or the other, and at the same time it is not applicable to those cases where a change of velocity is desirable.

The only way that friction-gearing has heretofore been applied to accomplish a change of velocity between two limits of speed is where a wheel is pressed against a face-plate whose axle is at right angles to the axis of the wheel, and the relative speed of the two shafts is governed by the position occupied by the wheel on the face-plate at a greater or less distance from its center; but this device fails also to meet the requirements above stated, as it is liable to all the objections urged against the plain friction-wheels, besides the grinding motion due to the position of the axis of rotation.

The nature of my invention consists in the employment of disk-wheels which transmit motion by frictional contact upon their sides, the frictional surfaces being so arranged as to insure contact only upon the line of centers of any two wheels, while the pressure required to produce the necessary adhesion, being upon the opposite surfaces, may be so contrived as to produce that result only without much, if any, pressure from this cause upon the journals upon which they revolve, and at the same time this side pressure may be so arranged as to follow up the wear and inequalities of surface, without interfering with the position of the centers of rotation.

To accomplish this result, various plans may be adopted, some of which are represented in the annexed drawing, making part of this specification, in which—

Figure 1 represents a front elevation of a machine arranged on the principle of my invention. Fig. 2 represents a side elevation of the same machine; and Figs. 3, 4, 5, 6, 7, and 8, various modifications of the same principle, similar letters referring to similar parts.

To accomplish the transmission of motion only, A B, Fig. 5, represent two shafts placed parallel, the one being the driver A and the other the driven B. On these two shafts are placed disks C and C', having their diameters less than the distance between the two shafts. The sides of these disks are beveled, so as to make them thicker near their hubs than at their periphery, as is shown by the dotted line $x\ y$. Midway between the edges of these disks and on the plane of their shafts is placed an intermediate shaft, D. Upon this shaft are two disks, E and E', of sufficient diameters to allow them to overreach the peripheries of the disks C and C'. Their faces are beveled to match the bevel of the disks C and C', and hence will bear on the line of centers between each two shafts, respectively, and not over any extended area, as would be the case if the disks were all flat and touched over the surfaces of the segments opposed to one another. The disks E and E' are loose upon their shafts D, and are forced together by a powerful spring, F, which can be compressed to any required degree by a nut and washer, G, thus keeping up the pressure on the contact-surfaces to the amount necessary for adhesion without requiring any adjustment of the centers of the shafts A and B. The strain to produce this pressure is a tensile strain on the shaft D, and hence is not applied directly against the bearings of the shafts A and B, as is the case with the belt and pulleys or the ordinary plain friction-gearing, the only pressure from this cause being the slight tendency to wedge out during the rolling motion on the beveled sides. This tendency is diminished by making the sides of the disks with only enough bevel to give clearance.

In the operation of this form of gearing it is evident that, if the shaft A be made to revolve, it will, from the adhesion on the contact-surfaces above described, transmit its motion to the shaft B through the intervention of the disks E and E', which act as idlers. This represents one application of my invention, and relates only to the transmission of motion, filling the requirements of the first and third objects of my invention, but is not applicable to the second object, or the furnishing of a ready means of changing the relative velocity of the driver and driven.

To accomplish this, there are two general modes, the same in principle, but differing in application, the first of which is represented in Figs. 4 and 6, where it is shown that the disks C and C' on the shafts A and B are in diameter about two-thirds of the distance between the two shafts. Their sides are beveled, as in the former case, not in a right line, but in a curve, making their sides convex, but still keeping them larger near their hub than at their periphery. This curve is struck from a line midway between the two shafts, and is shown by the dotted line $x\ y$.

The disks E and E' are made large enough in diameter to overlap the edges of the disks C and C' to any required amount suited to the change of velocity required. The faces of the disks E and E' are convex and of the same curvature as the faces of the disks C and C'. They are dished out in their centers, leaving only a small rim for contact-surface. They are provided with the same spring F and nut and washer G as in the former case, but with the addition of balls and sockets $h$ and $h'$ in the center, to allow their plane of motion to deviate from a right angle to their axis, or that they may be free to wabble on their shaft D. Now, it is evident that when the shaft D is placed midway between the shafts A and B (the diameter of the disks C and C' being the same) the motion of the shaft A will be transmitted to the shaft B through the disks E and E', as in the former case, and that the speed of the two shafts will be the same. If, however, we move the shaft D toward the shaft B, even so far as to allow the surface-contact to be quite on the extreme edge of the disk C, as is shown at Fig. 6, the contact-surface on the disk C' will be near to the hub; hence the arrangement will represent a wheel of a given diameter driving a wheel of much smaller diameter through the intervention of an idler, and the speed of the driven shaft B will be accelerated. That the reverse of this, or a diminution of speed, will take place, if the shaft D be moved near to the shaft A is evident, and also that the speed can be varied to any degree between the two extremes of velocity.

The reason for curving instead of beveling the surfaces in a right line is to insure them fitting over the contact-surfaces on the line of centers, which would not be the case if beveled in a right line, except in the position to which the bevels were first adapted.

The second general mode to which I have made allusion is shown at Fig. 3, where the faces of the disks C and C', also E and E', are curved in the same manner as at Figs. 4 and 6, and provided with the same ball-and-socket movement; but the disks C and C' are dished out, leaving the convex faces of the disks E and E' entire.

When the shaft D occupies a central position, the case is analogous to those already described; but if it be brought near to one or the other of the shafts A or B the circumstances are changed. The disks E and E' cease to be idlers, but serve themselves to modify the speed, and the case would be analogous to the substitution of a pair of intermediate gear-wheels of different diameters on one shaft, taking the motion from a wheel of a given size on the driving-shaft to one of the same size on the driven shaft, the difference of speed being influenced by the difference in the size of the two intermediate wheels.

Figs. 1 and 2 represent a machine arranged on the principle of my invention, which will show to the mechanic a good method of applying the principle I claim.

The shafts A and B are supported in a stand, K, the driving-shaft A being provided with a crank, L.

The shaft D has its bearing in a lever, M, whose fulcrum N is provided with a broad surface, that it may be tightened up in any required position by the bolt and nut C. The lever M is of such a length between the fulcrum and the shaft D as to make the center of the shaft D deviate as little as possible from the plane of the centers of the shafts A and B in the limits of its motion between them. To illustrate its operation: If motion be given to the driving-shaft A by means of the crank L, the speed of the driven shaft B can be decreased or increased by moving the lever M to or from the driving-shaft.

Fig. 7 represents an application of my invention to the conversion of rotary into rectilineal motion. The driven disk is replaced by a straight strip of metal, C', having its sides curved in the same manner as the face of the driving-disk C, and the rectilineal motion of the strip C' will be governed in its speed by the position of the intermediate shaft D in the same manner as in all the former instances. In cases where it is not admissible to have the three shafts A, D, and B, but where either the driver or the driven can be moved, a plan may be adopted to give variation of speed, which is shown at Fig. 8. The disk C on the shaft A has its sides beveled in right lines, as is shown by the dotted line x y. The disks E and E' are furnished with long hubs, also with springs and washers to each. The faces of the disks E and E' are beveled to match the face of the disk C, and dependence is placed on the length of the hubs of the disks E and E' and the stiffness of the shaft B to keep the surfaces in contact. In this case the speed is varied by changing the position of the center of the driver and driven in relation to one another. I do not, however, recommend this to be used except in extreme cases, and when there is but little power to be transmitted.

From the above illustrations of various modes of applying the principle of my invention it is evident that the essential feature of the whole of them is the side clamping of the disks E and E', so as to obtain the requisite amount of adhesion on the contact-surfaces of the disks C and C'. This amount of adhesion is capable of being increased to any required amount within the limits of the tensile strength of the shaft D. The contact-surfaces are on the line of centers between the shafts only. The motion on these surfaces during rotation is a planishing motion, in which new lines of contact are coming into play in a constant change, and the surfaces are capable of being kept well lubricated; and, further, that the application to producing change of velocity is a consequence of the mode of producing the pressure on the sides of the disks; hence this principle must be the fundamental one on which the theory of its operation is based.

In all my illustrations I have presumed that the motion and power required can be transmitted through one set of disks; but it is almost needless to say that where a great amount of power is to be transmitted a number of sets of disks can be placed side by side on the same shafts.

Having described my invention in relation to its object, nature, and theory of its operation in such a manner as to enable the ingenious mechanic to apply it to all forms of machines, I wish it clearly understood that I do not confine my invention to the precise form and arrangement of parts described; but

What I claim as new, and desire to secure by Letters Patent, is—

1. The use of clamping-wheels or their equivalents to transmit motion when said wheels are so arranged as to produce the necessary pressure upon the driving-surfaces by a movement at right angles to their plane of motion, substantially in the manner and for the purpose specified.

2. The use of clamping-wheels or their equivalents when they are so arranged that the relative position of the axis of one or more of such wheels may be changed so as to produce a change of velocity, substantially in the manner specified.

COLEMAN SELLERS.

Witnesses:
THEODORE BERGNER,
OLIVER HOUGH.